United States Patent
Bouzounie

[19]

[11] Patent Number: 5,590,987
[45] Date of Patent: Jan. 7, 1997

[54] PRECISION TWIST DRILL BIT

[75] Inventor: Lucien Bouzounie, Pontault-Combault, France

[73] Assignee: Etablissements Recoules et Fils (S.A.), France

[21] Appl. No.: 284,513
[22] PCT Filed: Dec. 9, 1993
[86] PCT No.: PCT/FR93/01214
  § 371 Date: Aug. 4, 1994
  § 102(e) Date: Aug. 4, 1994
[87] PCT Pub. No.: WO94/13421
  PCT Pub. Date: Jun. 23, 1994

[30] Foreign Application Priority Data

Dec. 9, 1992 [FR] France ................ 92 14820

[51] Int. Cl.⁶ ...................................... B23B 51/02
[52] U.S. Cl. ............................. 408/230; 408/227
[58] Field of Search ....................... 408/227, 229, 408/230

[56] References Cited

U.S. PATENT DOCUMENTS

| | | | |
|---|---|---|---|
| 1,467,491 | 9/1923 | Oliver | 408/230 |
| 2,936,658 | 5/1960 | Riley | 408/230 |
| 4,116,580 | 9/1978 | Hall et al. | 408/230 |
| 5,141,369 | 8/1992 | Palace | 408/230 |

FOREIGN PATENT DOCUMENTS

| | | | |
|---|---|---|---|
| 2656554 | 7/1991 | France | |
| 3336018 | 4/1985 | Germany | 408/230 |

OTHER PUBLICATIONS

Tool and Manufacturing Engineers Handbook, vol. 1, Machining, Society of Manufacturing Engineers, 1983, Chapter 9, pp. 14–15.

*Primary Examiner*—Daniel W. Howell
*Attorney, Agent, or Firm*—Eckert Seamans Cherin & Mellott

[57] ABSTRACT

A precision twist drill bit provided with two helical teeth separated by grooves. According to the invention, its diameter is equal to the minimum diameter of the hole to be drilled plus 0.005 mm, the width of the land (3) lies in the range 0.1 mm to 0.2 mm, neither tooth is ahead of the other, the end is ground so that it has two slopes with pits (4) that radiate from the center, the cutting edges (1, 2) of the two pits (4) are symmetrical, and all of the surfaces of the drill bit are polished to within an accuracy of less than 0.1 microns Ra.

1 Claim, 1 Drawing Sheet

PRECISION TWIST DRILL BIT

The present invention relates to a precision twist drill bit.

Drill bits are well known and have been used for a very long time for drilling cylindrical holes. It is known that, going from the top to the bottom, a drill bit has a point which centers the tool and which is extended by two blades, each of which is edged by a lip, the blades being separated by two flutes which extend helically towards the bottom of the drill bit and which receive the swarf of the cut metal and remove it, in general upwards. At the point, the blades of the drill define a first clearance, the lands of the drill form a second clearance.

Unfortunately, the precision obtained in such drilling is about one-tenth of a millimeter, and when a determined higher precision is required, or when a good quality surface state is essential, a subsequent reaming operation must be performed to improve the hole drilled by the drill bit. In other words, an initial hole is drilled, and that hole is then usually reamed by using the tool or a reamer to obtain the final quality (H7–H8). When there are a large number of holes to be drilled, the resulting lost time adds to the production costs.

An object of the present invention is to mitigate that drawback, and to provide a tool enabling drilling to be performed directly without any re-working or any burrs, and to a tolerance of not more than 0.03 millimeters with a surface state of less then 0.8 microns Ra. This result is obtained by strictly defining the geometrical shape and the surface state of the tool.

The precision drill bit of the present invention is characterized in that:

its diameter is equal to the minimum diameter of the hole to be drilled plus 5 thousandths of a millimeter;

it has a narrow lip lying in the range 0.1 mm to 0.2 mm;

neither blade is ahead of the other; each blade is ground to form a depression which extends into the first and second clearances as well as the flute thereby forming a cutting edge.

the cutting edges of the two depressions are symmetrical relative to the center of the tool; and all of the surfaces of the drill bit are polished to within an accuracy of less than 0.1 microns Ra.

By determining this set of parameters, it is possible to obtain the desired result when they are simultaneously present.

By polishing the surfaces of the flutes, of the depression and lips, it is easier to remove the swarf which then does not degrade the inside surface of the hole.

Naturally, the tool may be made of rapid-machining steel or of any other material that is commonly used for drilling holes, such as tungsten carbide, ceramic, etc.

Other characteristics and advantages of the invention will appear on reading the following description of a particular embodiment given by way of non-limiting example, and with reference to the accompanying drawing, in which.

The figures show that the point of the drill bit includes two blades formed with lips 1 and 2, the blades being ground to a point angle. The blades of the drill define a first clearance 3, and the lands of the drill 7 define a second clearance.

Figure 1:
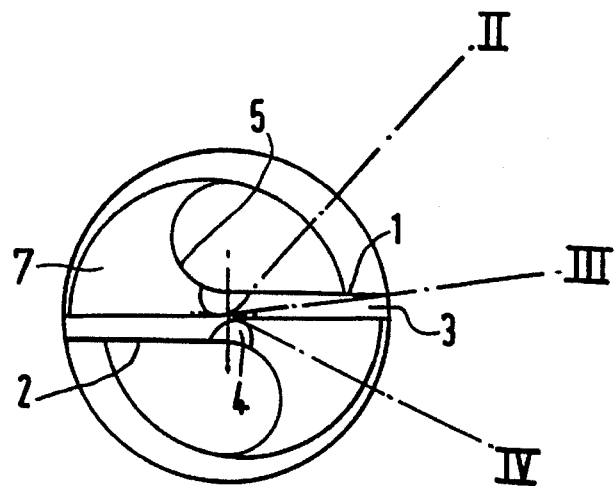
FIG. 1 shows a drill bit of the invention seen from the front.

In accordance with one of the characteristics of the invention, the width of the first clearance is very small, and is in the approximate range 0.1 mm to 0.2 mm. The point of the drill bit is formed with two depression 4 which are gymmetrical with respect to one another about the axis of the drill bit. Each depression is basically spherical in shape extending into the first and second clearances as well as the flute of the drill bit thereby defining a basically circular edge. As shown in FIG. 1, each depression forms a cutting edge at the intersection of the depression and the lip formed in the blade. About one-third circular edge is a cutting edge is formed in the first clearance and two-thirds of the circular edge is formed in the second clearance and flute.

The cutting edges of the two depressions 4 must be symmetrical about the center of the tool, with constant thickness as a reference. The point of the tool must be exactly in the center of the tool.

Figure 2:
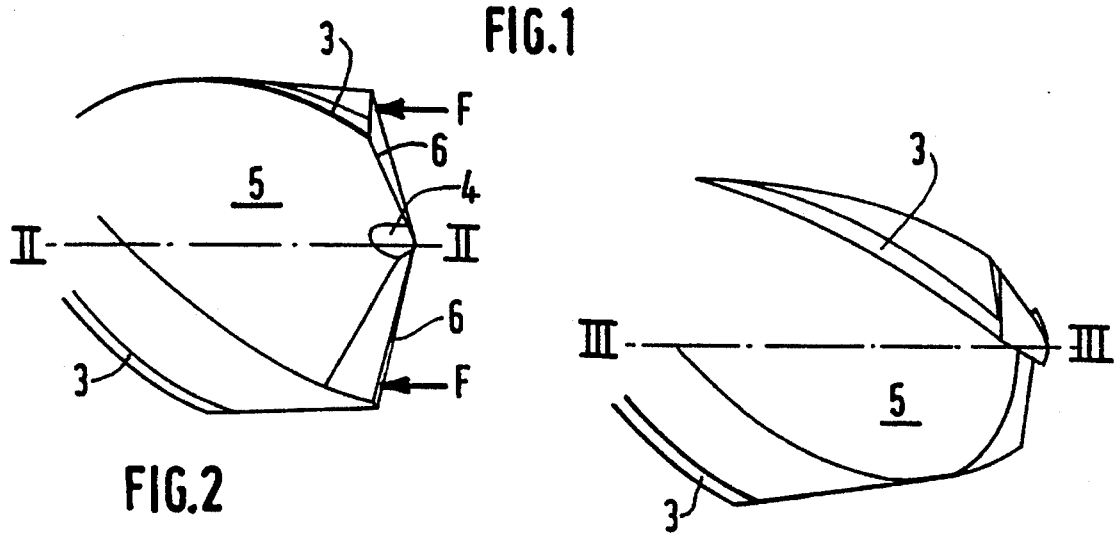
FIG. 2 shows the front of the drill bit seen looking in direction II of FIG. 1.
Figure 3:
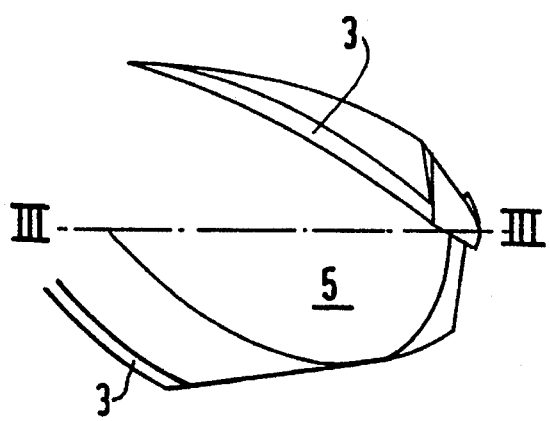
FIG. 3 shows the front of the drill bit seen looking in direction III of FIG. 1.
Figure 4:
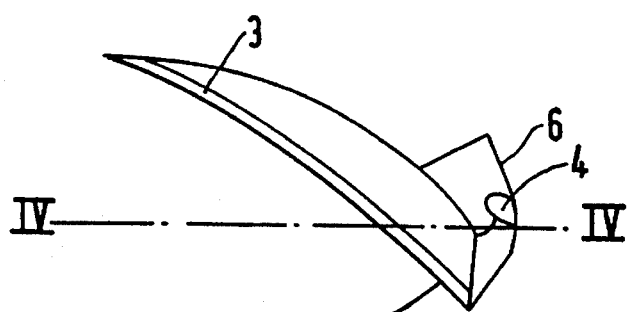
FIG. 4 shows the front of the drill bit seen looking in direction IV of FIG. 1.

As represented by the arrows F on FIG. 2, the front portions 6 of the blades 1 and 2 must be level with each other, i.e. neither lip must be in front of the other, so that the metal to be drilled is engaged by both teeth simultaneously. This is checked by means of a comparator, with the tool being rotated through 90°. The two measurements must be identical, i.e. neither tooth is ahead of the other.

Naturally, numerous variants may be made, in particular by using technically equivalent means, without going beyond the ambit of the invention.

I claim:

1. A one piece twist drill comprising:

a cylindrical surface with an axis of symmetry, the cylindrical surface having two spiral flutes;

a cutting point defined by two diametrically opposed blades defining each blade having a first clearance, two lands each defining a second clearance, and a third clearance defined by two depressions formed in the first clearances, second clearances and flutes, each of said blades being formed with a lip and said depressions defining cutting edges formed in the first clearance, the cutting edges of the two depressions being symmetrical relative to the center of the drill, wherein said first clearance is in the range of 0.1 to 0.2 mm wide, wherein the blades are aligned symmetrically about the axis of symmetry and the drill is surface finished to a dimensional accuracy of less than 0.1 micron Ra.

* * * * *